United States Patent
Yamaguchi et al.

(10) Patent No.: US 6,577,511 B2
(45) Date of Patent: Jun. 10, 2003

(54) SWITCHING POWER SUPPLY UNIT AND ELECTRONIC APPARATUS USING THE SAME

(75) Inventors: Satoshi Yamaguchi, Kyoto (JP); Akio Nishida, Kyoto (JP); Hiroshi Takemura, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/090,152

(22) Filed: Mar. 5, 2002

(65) Prior Publication Data
US 2002/0136031 A1 Sep. 26, 2002

(30) Foreign Application Priority Data

Mar. 26, 2001 (JP) .......................................... 2001-088334
Nov. 7, 2001 (JP) .......................................... 2001-341990

(51) Int. Cl.[7] ............................................. H02M 3/335
(52) U.S. Cl. ............................. 363/21.07; 363/21.08; 363/21.15; 363/19
(58) Field of Search .......................... 363/18, 19, 21.07, 363/21.08, 21.15, 21.16; 323/902

(56) References Cited

U.S. PATENT DOCUMENTS 5,012,399 A * 4/1991 Takemura et al. .......... 323/902
6,078,508 A * 6/2000 Okamura et al. ............ 363/18
6,314,004 B1 * 11/2001 Higuchi ....................... 363/19

FOREIGN PATENT DOCUMENTS

| EP | 0 935 332 A2 | 8/1999 |
| EP | 0 935 333 A2 | 8/1999 |
| EP | 1 020 980 A2 | 7/2000 |
| GB | 2 370 887 A | 7/2002 |
| JP | 7-67335 | 3/1995 |

* cited by examiner

*Primary Examiner*—Bao Q. Vu
(74) *Attorney, Agent, or Firm*—Keating & Bennett, LLP (57) ABSTRACT

A switching power supply unit includes a control circuit including a turn-off circuit for turning of a first switch element Q1, which has been in an ON state, and an off-period control circuit for, based on a feedback signal from an output-voltage detecting circuit, controlling the turning-on of the first switch element to be further delayed as a load is lighter. The off-period control circuit includes a transistor as a second switch element which is provided in series between a feedback winding and the control terminal of the first switch element and which is controlled to be turned on and off based on the feedback signal from the output-voltage detecting circuit. A switching frequency is set to be lower as the load is lighter, such that power consumption at the light load is reduced.

20 Claims, 9 Drawing Sheets

SWITCHING POWER SUPPLY UNIT AND ELECTRONIC APPARATUS USING THE SAME

BACKGROUND OF THE INVENTION

1. Field of the Invention

The present invention relates to a switching power supply unit and an electronic apparatus including such a switching power supply unit.

2. Description of the Related Art

In printers, facsimile machines, and other electronic apparatuses, reduction of power consumption in a standby mode, that is, when no printing operation is performed, is in great demand. One demand is that, when a power supply unit for use in a printer or a facsimile machine is in standby mode, that is, in a light load mode, power consumption must be reduced.

It is impossible for a conventional RCC switching power supply unit to reduce its power consumption because it includes a feature in which, as load is reduced, a switching frequency increases, thus increasing switching loss.

An RCC switching power supply unit for reducing power consumption in a light load mode has been disclosed in Japanese Unexamined Patent Application Publication No. 7-67335. The switching power supply unit in Japanese Unexamined Patent Application Publication No. 7-67335 includes a circuit that grounds the control terminal of a first switch element for a desired amount time, whereby the turn-on operation of the first switch element is delayed such that power consumption in the light load mode is reduced.

Nevertheless, the switching power supply unit in Japanese Unexamined Patent Application Publication No. 7-67335 has a problem in that, by controlling only the switching frequency such that it is less than a desired level, substantial reduction in the power consumption by greatly lowering the switching frequency in the light load mode cannot be achieved.

Another problem is that the switching frequency cannot adjust to a rapid change of the load. For example, where settings are used such that the switching frequency greatly changes between the light load mode and a heavy load mode, when the load rapidly changes from light to heavy, the switching frequency cannot adjust to the change of the load, such that a decrease in the output and termination of power supply occurs. Accordingly, there is a problem in that the switching frequency cannot be substantially reduced in the light load mode.

SUMMARY OF THE INVENTION

In order to overcome the above-described problems, preferred embodiments of the present invention provide a switching power supply unit that greatly reduces power consumption by greatly lowering a switching frequency in a light load mode, and an electronic apparatus including such a novel switch power supply unit.

According to a preferred embodiment of the present invention, a switching power supply unit is includes a transformer having a primary winding, a secondary winding, and a feedback winding, a first switch element connected in series to the primary winding, a control circuit provided between the feedback winding and a control terminal of the first switch element, a rectification circuit connected to the secondary winding, and an output-voltage detecting circuit which detects an output voltage output from the rectification circuit and feeds back the voltage to the control circuit. The control circuit includes a turn-off circuit for turning off the first switch element when it has been in an ON state, and an off-period control circuit which controls the off-period of the first switch element to be longer as a load is lighter, based on a feedback signal from the output-voltage detecting circuit, by delaying the turning-on of the first switch element.

Preferably, the off-period control circuit includes a second switch element which is provided between the feedback winding and the control terminal of the first switch element and which is controlled to be turned on and off based on the feedback signal from the output-voltage detecting circuit.

The second switch element may be an NPN transistor or an n-channel FET.

The switching power supply unit preferably includes a limit circuit for preventing a control voltage for the first switch element from exceeding a desired range, which is included in the second switch element.

The off-period control circuit preferably includes a second switch element provided between the feedback winding and the control terminal of the first switch element, and a time constant circuit which is arranged to the control terminal of the second switch element and in which a time constant is controlled based on the feedback signal of the output-voltage detecting circuit. The output-voltage detecting circuit further includes a negative feedback circuit for maintaining the feedback signal to be substantially constant.

The turn-off circuit also preferably includes an on-period extension circuit which makes the on-period of the first switch element longer as a period in which the turning-on of the first switch element is delayed by the off-period control circuit is shorter.

The turn-off circuit further preferably includes a third switch element which turns on the first switch element by connecting to the control terminal of the first switch element to be turned on. The on-period extension circuit further preferably includes a capacitor which is connected to the control terminal of the third switch element and which is controlled to discharge in accordance with the length of the off-period of the first switch element after charging in a reverse direction in the off-period of the first switch element, and is controlled to charge in a forward direction to a voltage turning on said third switch element during the on-period of the first switch element.

The off-period control circuit and the turn-off circuit included in the control circuit accelerate, based on the feedback signal from the output-voltage detecting circuit, the timing with which the turn-off circuit performs turning off during the off-period of said first switch element.

The off-period control circuit also preferably includes a phototransistor which receives the feedback signal from the output-voltage detecting circuit, and the emitter of the phototransistor is be connected to an on-period extension circuit such that a current flowing in the phototransistor charges the capacitor of the on-period extension circuit.

The control circuit further includes a voltage supply circuit for supplying a control voltage to the off-period control circuit by using a voltage generated in the feedback winding.

The switching power supply unit also preferably includes a direct-current voltage supply for supplying a driving voltage to the off-period control circuit by using the voltage generated in the feedback winding, and a constant voltage regulator provided between an input power supply and the output of the direct-current voltage supply that prevents a current from flowing in reverse.

According to another preferred embodiment of the present invention, an electronic apparatus includes at least one of the switching power supply unit according to the preferred embodiments described above.

According to a switching power supply unit of preferred embodiments of the present invention, a control circuit includes a turn-off circuit for turning off a first switch element, which has been in an ON state, and an off-period control circuit for, based on a feedback signal from an output-voltage detecting circuit, controlling the turning-on of the first switch element to be delayed longer as a load is lighter, and the off-period control circuit includes a second switch element which is electrically connected in series between a feedback winding and the control terminal of the first switch element and which is controlled to be turned on and off based on the feedback signal from the output-voltage detecting circuit, such that a switching frequency is set to be lower as the load is lighter to greatly reduce power consumption at light loads.

In addition, according to an electronic apparatus of a preferred embodiment of the present invention, by using a switching power supply unit of other preferred embodiments of the present invention, efficiency is greatly increased.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Figure 1:
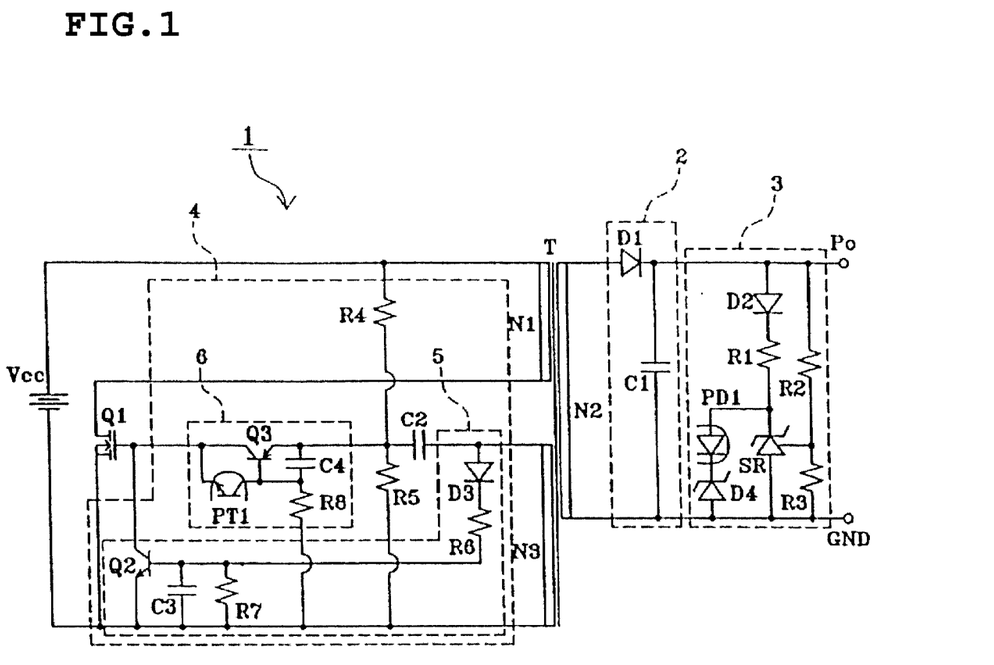
FIG. 1 is a circuit diagram showing a preferred embodiment of a switching power supply unit of the present invention.

FIG. 1 shows a circuit diagram of a preferred embodiment of a switching power supply unit of the present invention. In FIG. 1, a switching power supply unit 1 includes a transformer T including a primary winding N1, a secondary winding N2, and a feedback winding N3, a first switch element Q1 defined by a direct-current power supply Vcc as an input power supply connected in series to the primary winding N1, a rectification circuit 2 connected between the secondary winding N2 and an output terminal Po, an output-voltage detecting circuit 3 connected to the output terminal Po, and a control circuit 4 provided between the feedback winding N3 and a gate as the control terminal of the switch element Q1.

The rectification circuit 2 includes a diode D1 connected in series to the secondary winding N2, and a smoothing capacitor C1 connected between the cathode and the ground of the diode D1.

The output-voltage detecting circuit 3 includes a series circuit having at least a diode D2, a resistor R1, and a shunt regulator SR, a series circuit defined by a resistor R2 and a resistor R3, which are connected between the output terminal Po and the ground, and a series circuit defined by a photodiode PD1 and a Zener diode D4 which are connected in parallel to the shunt regulator SR. A junction between the resistor R2 and the resistor R3 is connected to the control terminal of the shunt regulator SR.

The control circuit 4 includes a turn-off circuit 5 connected to the gate of the first switch element Q1, a capacitor C2 and an off-period control circuit 6 which are connected in series between one end of the feedback winding N3 and the gate of the first switch element Q1, a resistor R4 and a resistor R5 which are connected respectively between a junction of the capacitor C2 and the off-period control circuit 6 and one end of the direct-current power supply Vcc and between the junction and the other end. The resistor R4 is a starting resistor.

The turn-off circuit 5 includes an NPN transistor Q2 as a third switch element which has a collector and an emitter respectively connected to the gate and source of the first switch element Q1, a series circuit defined by a diode D3 and a resistor R6 which are connected between one end of the feedback winding N3 and the base as a control terminal of the transistor Q2, and a resistor R7 and a capacitor C3 which are respectively connected between the base and emitter of the transistor Q2.

The off-period control circuit 6 includes a PNP transistor Q3 as a second switch element which has an emitter and a collector respectively connected to the capacitor C2 and the gate of the first switch element Q1, a phototransistor PT1 connected between the base and collector of the transistor Q3, a capacitor C4 connected between the base and emitter of the transistor Q3, and a resistor R8 connected between the base as a control terminal of the transistor Q3 and the other end (ground) of the direct-current power supply Vcc. The phototransistor PT1 combines with the photodiode PD1 of the output-voltage detecting circuit 3 to define a photocoupler.

In the switching power supply unit 1 having the above-described structure, when the first switch element Q1, which is in on-condition, is turned off, magnetic energy stored in the transformer T allows a current to flow from the secondary winding N2 to a load connected to the output terminal Po via the rectification circuit 2. After the current stops flowing from the secondary winding N2 to the rectification circuit 2, when the transistor Q3 of the off-period control circuit 6 is turned on, a voltage generated at the emitter of the transistor Q3 is applied to the gate of the first switch element Q1, whereby the gate voltage of the first switch element Q1 exceeds a threshold level and the first switch element Q1 is turned on. A forward (a direction in which the diode D3 is forward-biased) voltage generated in the feedback winding N3 allows a current to flow into the capacitor C3 via the diode D3 and the resistor R6, such that the capacitor C3 is charged. The time constant of the capacitor C3 when it is charged is determined by the resistances of the resistor R6 and the resistor R7 and the capacitance of the capacitor C3. When the charging allows a voltage across the ends of the capacitor C3 to reach a desired value, the transistor Q2 is turned on, such that short-circuiting occurs between the gate and source of the first transistor Q1, whereby the first transistor Q1 is turned off. This is repeatedly performed, whereby a current is supplied from the output terminal Po to the load at a desired voltage.

The turn-off circuit 5 includes the diode D3. Thus, when the first switch element Q1 is turned off and a voltage having a reverse direction (direction in which the diode D3 is reverse-biased) is generated in the feedback winding N3, any voltage that would charge the capacitor C3 in either direction is not applied to the capacitor C3. Accordingly, the electric charge in the capacitor C3 is discharged only through the resistor R7, and the voltage across the ends of the capacitor C3 is decreased to zero volts after a desired period of time. When a voltage in which the diode D3 is forward-biased is generated in the feedback winding N3, the initial value of the voltage across the ends of the capacitor C3 is zero volts. Thus, the time required for the voltage across the ends of the capacitor C3 to reach a desired value after the switch element Q1 is turned on, the voltage by which the diode D3 is forward-biased is generated in the feedback winding N3, is always constant. Accordingly, a period (on-period) from the turning on to the turning off of the first switch element Q1 is also constant.

Next, the operations of the output-voltage detecting circuit 3 and the off-period control circuit 6 are described. Because, in the output-voltage detecting circuit 3, the photodiode PD1 is connected in parallel to the series connection circuit defined by the shunt regulator SR and the Zener diode D4, it does not emit light when a voltage at the output terminal Po is high and the shunt regulator SR is in an on-condition, while it emits light when the voltage decreases and the shunt regulator SR is in an off-condition. When the photodiode PD1 emits light, the phototransistor PT1 in the off-period control circuit 6 is in conduction. When the phototransistor PT1 is in conduction, the transistor Q3 is in conduction, such that the first switch element Q1 can be turned on. Conversely, while the transistor Q3 is not in conduction, the turning-on of the switch element Q1 is delayed and the switch element Q1 cannot be turned on. Accordingly, a period in which the turning-on of the switch element Q1 is delayed is called a turn-on delay period.

The voltage at the output terminal Po is the highest at the time a current begins to flow from the secondary winding N2, and gradually decreases as magnetic energy stored in the transformer T decreases due to the flow of the current. A speed at which the current decreases is dependent on the magnitude of the load connected to the output terminal Po, and the current decreases slower as the load is lighter. When the voltage at the output terminal Po slowly decreases, the photodiode PD1 slowly emits light, the transistor Q3 is slow in conduction, and the turning-on of the first switch element Q1 is slow. Accordingly, the off-period of the first switch element Q1 is extended and the switching frequency decreases.

Conversely, when the load is heavy, the photodiode PD1 quickly emits light since the voltage at the output terminal Po quickly decreases, and the first switch element Q1 is quickly turned on since the transistor Q3 is quick in conduction. Accordingly, the off-period of the first switch element Q1 is shortened and the switching frequency increases.

Figure 2:
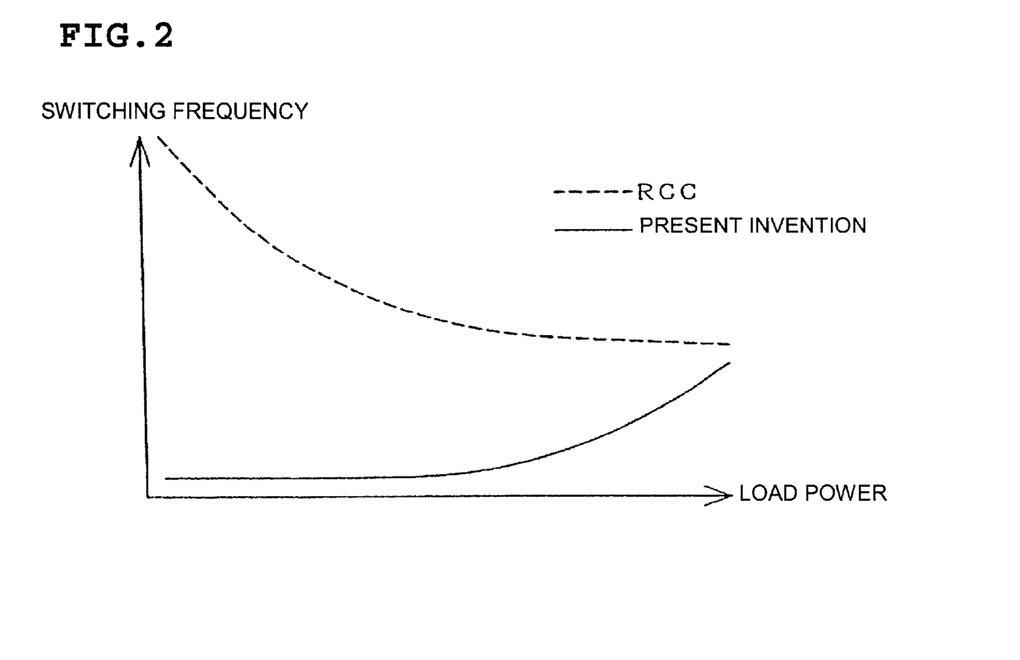
FIG. 2 is a graph of characteristics showing the relationship between load power and a switching frequency in the switching power supply unit in FIG. 1.

FIG. 2 shows the relationship between the load power and the switching frequency in the switching power supply unit 1 of a preferred embodiment of the present invention with comparison to a common RCC case. Large load power represents a heavy load. As shown in FIG. 2, by controlling the off-period of the first switch element Q1 while maintaining its on-period to be constant in the switching power supply unit 1, the switching frequency decreases as the load becomes lighter, and the switching frequency increases as the load become heavier. Accordingly, the switching loss at light loads is greatly reduced as compared with the related-art RCC switching power supply unit. This enables a reduction in the power consumption at light loads and in the amount of generated heat.

Figure 3:
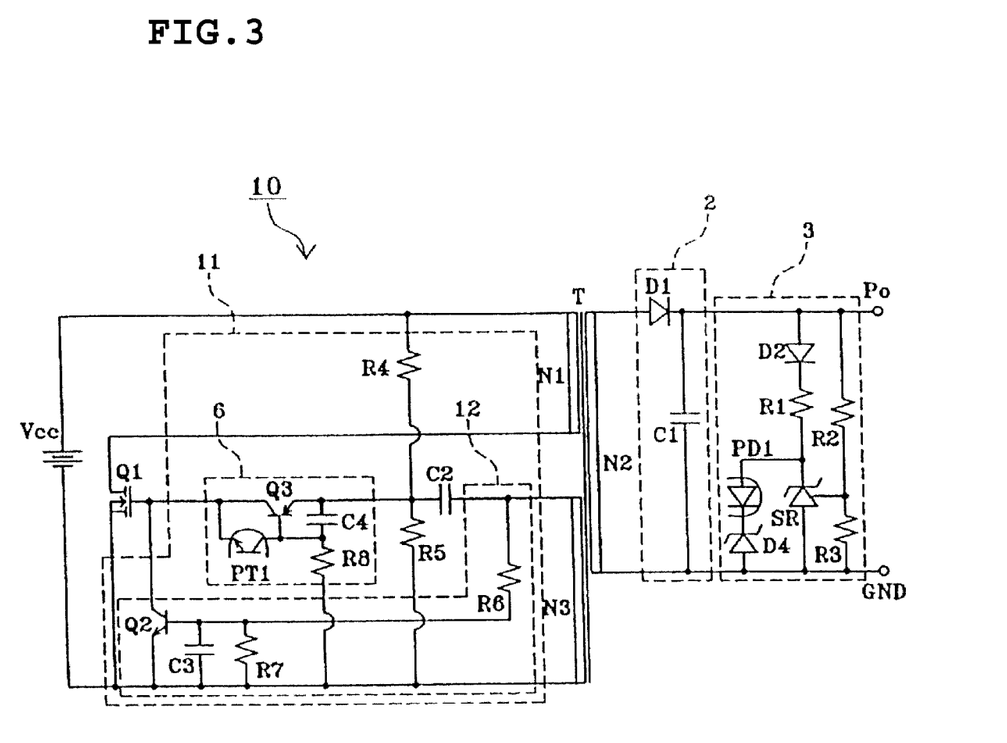
FIG. 3 is a circuit diagram showing another preferred embodiment of the switching power supply unit of the present invention.

FIG. 3 shows a circuit diagram of another preferred embodiment of the switching power supply unit of the present invention. In FIG. 3, portions that are identical or equivalent to those in FIG. 1 are denoted by identical reference numerals, and the description thereof is omitted.

In FIG. 3, a switching power supply unit 10 includes a control circuit 11 in place of the control circuit 4 in the switching power supply unit 1 in FIG. 1. The control circuit 11 includes a turn-off circuit 12 in place of the turn-off circuit 5 in FIG. 1. In the turn-off circuit 12, the diode D3 that was included in the turn-off circuit 5 is omitted.

Figure 4:
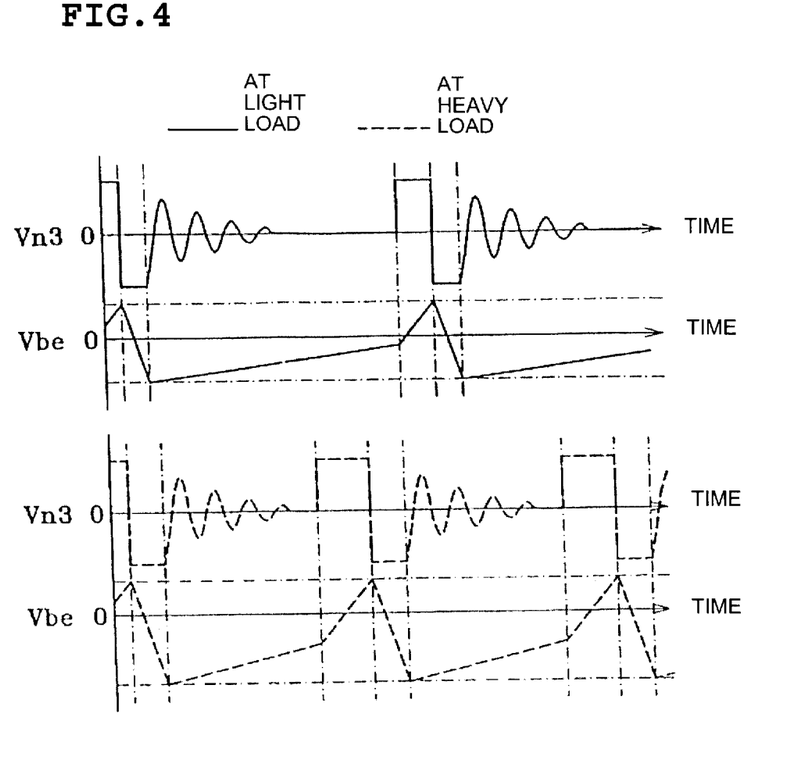
FIG. 4 are waveform charts showing temporal changes in voltages in portions of the switching power supply unit in FIG. 3.

Here, FIG. 4 shows temporal changes between a voltage Vn3 generated in the feedback winding N3 and the base-emitter voltage Vbe of the transistor Q2 in the switching power supply unit 10. Referring thereto, the operation of the switching power supply unit 10 is described.

In the switching power supply unit 10, when a first switch element Q1 is turned off allowing a current to flow from a secondary winding N2 to a rectification circuit 2 because a voltage stored in a capacitor C3 increases Vbe and a transistor Q2 is turned on, the polarity of voltage Vn3 generated in the feedback winding N3 is reversed. This applies a reverse voltage to the capacitor C3, and not only discharges an electric charge stored for turning on the transistor Q2, but also reversely charges the capacitor C3. In other words, the base-emitter voltage Vbe of the transistor Q2 becomes negative. The transistor Q2 is only turned on for a moment in order to turn off the first switch element Q1, and is immediately turned off with a decrease in the base-emitter voltage Vbe.

When the current from the secondary winding N2 to the rectification circuit 2 does not flow, the voltage of the feedback winding N3 converges to zero volts while vibrating. The electric charge in the capacitor C3 is simultaneously discharged through the resistor R7, and a voltage in the negative direction across the ends of the capacitor C3 gradually decreases. In other words, the base-emitter voltage Vbe of the transistor Q2 gradually approaches zero volts.

When the voltage at the output terminal Po is equal to or less than a desired value, causing the first switch element Q1 to be turned on, the voltage Vn3 generated in the feedback winding N3 has a forward direction, and the capacitor C3 restarts to be forward charged. At this time, where a light load connected to the output terminal Po and the turn-on delay period until the first switch element Q1 is turned on is long, the voltage in the negative direction across the ends of the capacitor C3 is low because a time in which the capacitor C3 discharges is long. Conversely, when a heavy load is connected and the turn-on delay period until the first switch element Q1 is turned on is short, the voltage in the reverse direction across the ends of the capacitor C3 is increased.

When the capacitor C3 is forward charged from the above-described state, the time required for reaching a desired voltage in the forward direction across the ends decreases as the voltage in the reverse direction as an initial value decreases. Accordingly, the time before the first switch element Q1 is turned off after the voltage across the ends of the capacitor C3 reaches a desired value and the transistor Q2 is turned on decreases as the load is lighter, and increases as the load is heavier. This means that the on-period of the first switch element Q1 is shorter as the load is lighter and is longer as the load is heavier. In other words, the turn-off circuit 12 itself functions as an on-period extending circuit.

As described above, in the switching power supply unit 10, as the load is lighter, the off-period of the first switch element Q1 increases and the on-period decreases, and as the load is heavier, the off-period of the first switch element Q1 decreases and the on-period increases. However, since the first switch element Q1 has an on-period that is shorter than an off-period, similar to the switching power supply unit 1, the switching frequency is lower as the load is lighter and the switching frequency is higher as the load is heavier. Accordingly, the switching loss at the light load is greatly reduced as compared with the related-art RCC switching power supply unit, resulting in a reduction in the power consumption and in heat that is generated at light loads.

In addition, in the switching power supply unit 10, the on-period of the first switch element Q1 is dependent upon the time constant of the resistor R6, the resistor R7, and the capacitor C3. In other words, the time when the first switch element Q1 is turned off is determined such that the voltage of the capacitor C3 reaches the on-voltage of the transistor Q2. However, when the load is heavier than required, the output voltage begins to decrease. A fall in the output voltage reduces the amount of discharge in C3, such that the on-period decreases. Accordingly, at a heavy load exceeding a level at which an overcurrent flows, the on-period decreases as the load increases, and overcurrent protection in the form of a wedge occurs.

Figure 5:
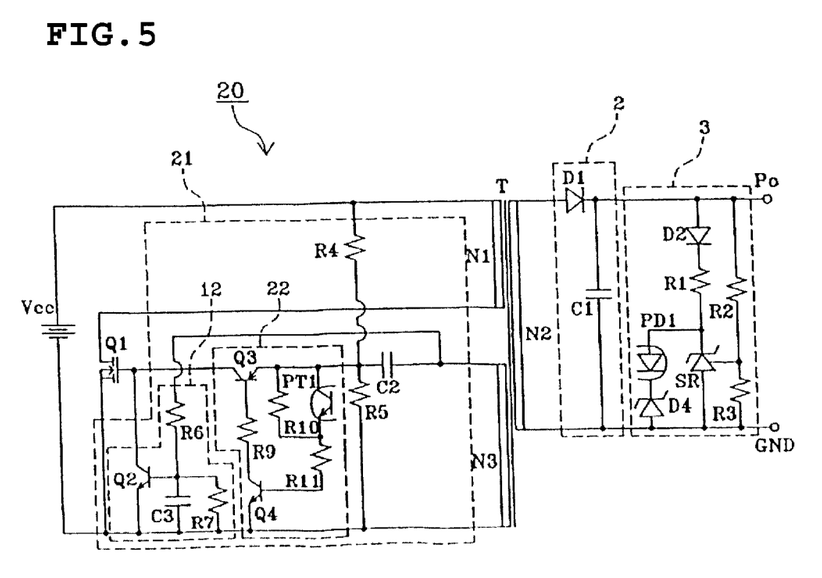
FIG. 5 is a circuit diagram showing still another preferred embodiment of the switching power supply unit of the present invention.

FIG. 5 shows a circuit diagram of another preferred embodiment of the switching power supply unit according to the present invention. In FIG. 5, portions that are identical or equivalent to those in FIG. 3 are denoted by identical reference numerals, and the description thereof is omitted.

In FIG. 5, a switching power supply unit 20 includes a control circuit 21 in place of the control circuit 11 in the switching power supply unit 10 in FIG. 3. The control circuit 21 includes an off-period control circuit 22 in place of the off-period control circuit 6 in FIG. 3.

The off-period control circuit 22 includes a PNP transistor Q3 as a second switch element in which an emitter and a collector are connected to a capacitor C2 and the gate of a first switch element Q1, respectively, an NPN transistor Q4 having an emitter connected to the ground, a resistor R9 connected between the base of the transistor Q3 and the collector of the transistor Q4, a series circuit defined by a resistor R10 and a resistor R11 which are connected between the emitter of the transistor Q3 and the base of the transistor Q4, a phototransistor PT1 connected in parallel to the resistor R11.

In the switching power supply unit 20 having the above-described structure, when a decrease in a voltage at an output terminal Po causes a photodiode PD1 in an output-voltage detecting circuit 3 to emit light, the phototransistor PT1 in the off-period control circuit 22 is in conduction and the transistor Q4 is turned on such that a current flows into its base via the phototransistor PT1 and the resistor R11, whereby the transistor Q3 is turned on and the first switch element Q1 is turned on. R10 is a starting resistor for turning on the transistor Q4.

Similar to the switching power supply unit 10 shown in FIG. 3, when the load is light, the photodiode PD1 slowly emits light and the transistor Q3 is slow in conduction, such that the first switch element Q1 is slowly turned on. Accordingly, the on-period of the first switch element Q1 is reduced and the off-period is increased, such that the switching frequency decreases. Conversely, when the load is heavy, the photodiode PD1 quickly emits light and the transistor Q3 is quick in conduction, such that the first switch element Q1 is turned on quickly. Therefore, the on-period of the first switch element Q1 increases and the off-period decreases, such that the switching frequency increases.

As described above, in the switching power supply unit 20 similar to the switching power supply units 1 and 10, by controlling the off-period of the first switch element Q1, the switching frequency is controlled to be decreased as the load is decreases, and is controlled to be increased as the load is increased. Accordingly, the switching loss at light loads is greatly reduced as compared with the related-art RCC switching power supply unit. This enables a reduction in the power consumption and in the amount of heat that is generated at light loads.

In addition, by providing the transistor Q4 between the base of the transistor Q3 and the ground, the speed of turning on and off the transistor Q3 is increased as compared with the switching power supply units 1 and 10 in FIGS. 1 and 10.

In other words, the speed at which the first switch element Q1 is turned on is determined by electrical charges which are stored in the gate per unit time. Thus, the quicker the transistor Q3 is turned on, the earlier the first switch element Q1 is turned on. However, the rise and fall time of the phototransistor PT1 are much longer than those of a common transistor. Thus, in the switching power supply units 1 and 10, a period in which the transistor Q3 operates in the active region is long which causes large switching loss of Q1. Conversely, in the switching power supply unit 20, the time in which the transistor Q4 operates in the active region is long, but the time for the transistor Q3 is short, such that the switching loss of the first switch element Q1 is further reduced.

Figure 6:
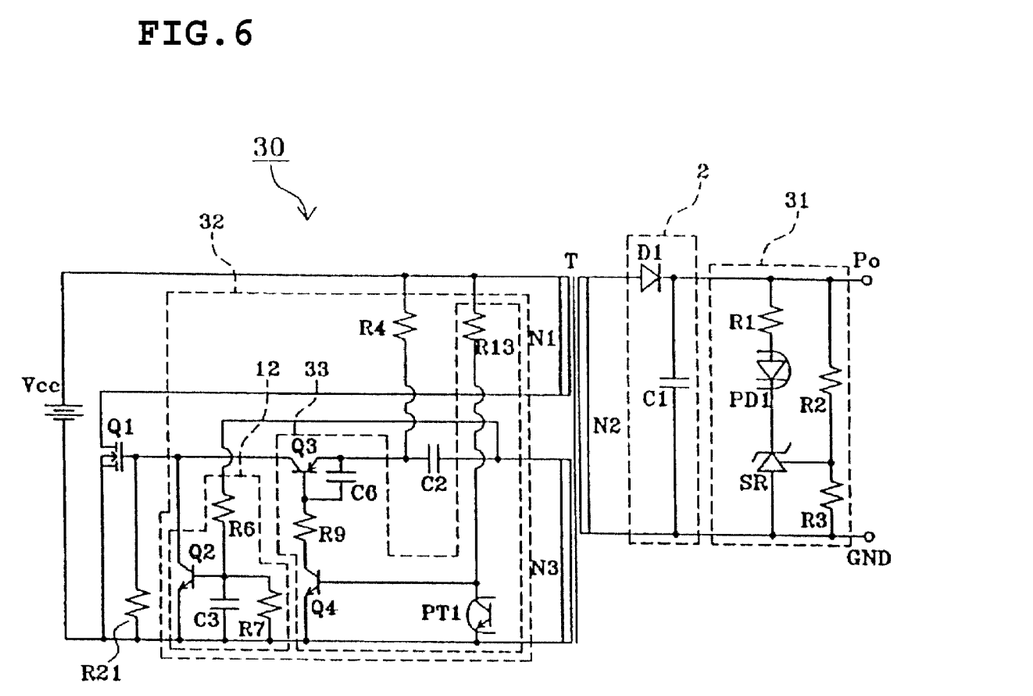
FIG. 6 is a circuit diagram showing still another preferred embodiment of the switching power supply unit of the present invention.

FIG. 6 shows a circuit diagram of another preferred embodiment of the switching power supply unit of the present invention. In FIG. 6, portions which are identical or equivalent to those in FIG. 5 are denoted by identical reference numerals, and the description thereof is omitted.

In FIG. 6, a switching power supply unit 30 includes an output-voltage detecting circuit 31 in place of the output-voltage detecting circuit 3 of the switching power supply unit 20 in FIG. 5. It also includes a control circuit 32 in place of the control circuit 21 in FIG. 5. In the control circuit 32, the resistor R5 included in the control circuit 21 is omitted, a resistor R21 is connected between the gate and source of a first switch element Q1, and an off-period control circuit 33 is included in place of the off-period control circuit 22. The resistor R5 and the resistor R21 prevent the first switch element from being broken due to the flow of an overcurrent by controlling the first switch element not to perform a switching operation when the output voltage of a direct-current power supply Vcc drops.

In the output-voltage detecting circuit 31, the diode D2 and the Zener diode D4 in the output-voltage detecting circuit 3 are omitted, a photodiode PD1 is connected in series between a resistor R1 and a shunt regulator SR.

The off-period control circuit 33 includes a PNP transistor Q3 as a second switch element in which its emitter and collector are respectively connected to a capacitor C2 and the gate of the first switch element Q1, respectively, an NPN transistor Q4 having an emitter connected to the ground, a resistor R9 connected between the base of the transistor Q3 and the collector of the transistor Q4, a capacitor C6 connected between the emitter and base of the transistor Q3, a resistor R13 connected between one end (one end of a primary winding N1) of a direct-current power supply Vcc and the base of the transistor Q4, and a phototransistor PT1 connected between the base and emitter of the transistor Q4.

In the switching power supply unit 30 having the above-described structure, the photodiode PD1 of the output-voltage detecting circuit 31 stops emitting light when a voltage at an output terminal Po drops. This prevents the phototransistor PT1 of the off-period control circuit 33 from being in conduction. Thus, the transistor Q4 is turned on when a current flows into its base via the resistor R13, and the transistor Q3 is turned on when its base voltage drops, such that the first switch element Q1 is turned on.

When the first switch element Q1 is turned off such that the transistor Q2 is turned on, a reverse voltage is generated in a feedback winding N3, and controls the capacitor C6 to discharge and the transistor Q3 to be turned off. The supply of power to the secondary side is initiated such that the first switch element Q1 is turned off, thus inverting the terminal voltage of the transformer. Thus, the first switch element Q1 is not turned on because a positive voltage is not supplied to the gate of the first switch element Q1.

In contrast to the switching power supply units 1, 10, and 20 shown in FIG. 1, FIGS. 4 and 5, the photodiode PD1 slowly stops emitting light when the load is light. This causes the transistor Q3 to be slow in conduction and the first switch element Q1 to be slowly turned on. Accordingly, the on-period of the first switch element Q1 increases, causing the switching frequency to decrease. Conversely, when the load is heavy, the photodiode PD1 quickly stops emitting light and the transistor Q3 is quick in conduction, such that the first switch element Q1 is quickly turned on. This decreases the off-period of the first switch element Q1 which causes the switching frequency to increase.

As described above, in the switching power supply unit 30, by controlling the off-period of the first switch element similarly to the switching power supply units 1, 10, and 20, the switching frequency is controlled to be lower as the load is lighter, and to be higher as the load is heavier. Accordingly, the switching loss at light loads is greatly reduced as compared with the related-art RCC switching power supply unit. This enables a reduction in the power consumption and in the amount of generated heat at light loads.

Figure 7:
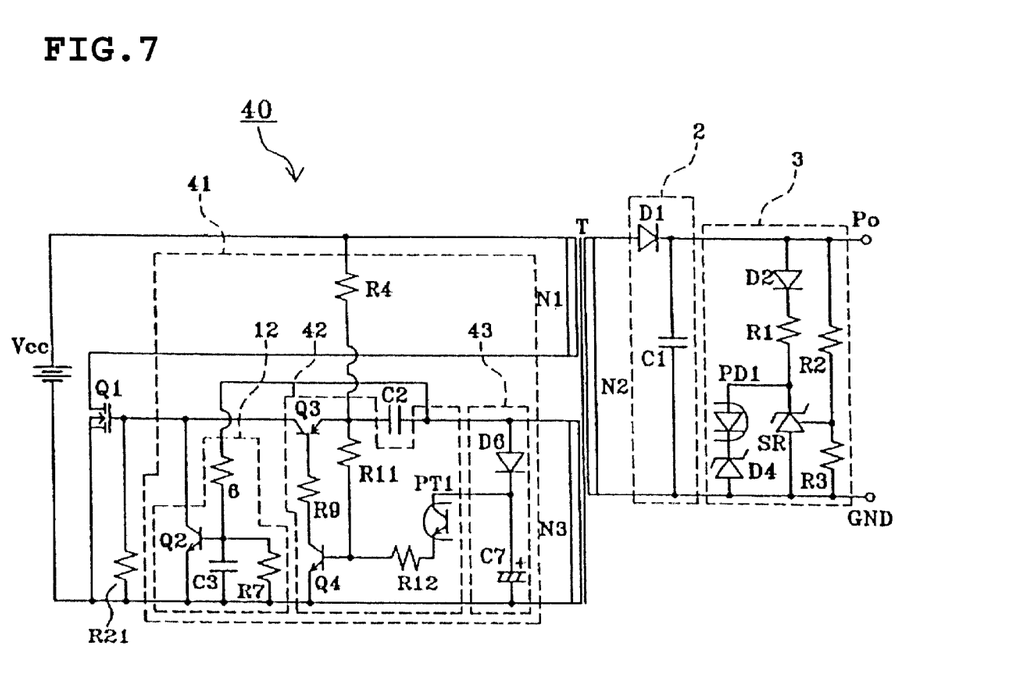
FIG. 7 is a circuit diagram showing still another preferred embodiment of the switching power supply unit of the present invention.

FIG. 7 shows a circuit diagram of another preferred embodiment of the switching power supply unit of the present invention. In FIG. 7, portions that are identical or equivalent to those in FIG. 5 are denoted by identical reference numerals, and the description thereof is omitted.

In FIG. 7, a switching power supply unit 40 includes a control circuit 41 in place of the control circuit 21 of the switching power supply unit 20 in FIG. 5. In the control circuit 41, the resistor R5 included in the control circuit 21 is omitted, and similar to the switching power supply unit 30 in FIG. 6, a resistor R21 is connected between the gate and source of a first switch element Q1, and an off-period control circuit 42 and a voltage-supply circuit 43 are included in place of the off-period control circuit 22.

The off-period control circuit 42 includes a PNP transistor Q3 as a second switch element in which its emitter and collector are respectively connected to a capacitor C2 and the gate of the first switch element Q1, an NPN transistor Q4 having an emitter connected to the ground, a resistor R9 connected between the base of the transistor Q3 and the base of the transistor Q4, a resistor R11 connected between the emitter of the transistor Q3 and the base of the transistor Q4, a phototransistor PT1, and a resistor R12 connected between the emitter of the phototransistor PT1 and the base of the transistor Q4.

The voltage-supply circuit 43 includes a diode D6 and a capacitor C7 which are connected across one end and the other end of a feedback winding N3. The junction between the diode D6 and the capacitor C7 is connected to the collector of the phototransistor PT1 in the off-period control circuit 42. In other words, the voltage-supply circuit 43 supplies a control voltage to the off-period control circuit 42. Here, the voltage supplied from the voltage-supply circuit 43 is not a voltage for driving the entirety of the off-period control circuit 42 but a driving voltage for only the phototransistor PT1, which receives a feedback signal from an output-voltage detecting circuit 3. Accordingly, the phrase "a control voltage for the off-period control circuit 42" is used.

In the switching power supply unit 40 having the above-described structure, the capacitor C7 is charged by a forward voltage which is generated in the feedback winding N3 when the first switch element Q1 is turned on. When the photodiode PD1 of the output-voltage detecting circuit 3 is controlled to emit light by a drop in a voltage at an output terminal Po, the phototransistor PT1 of the off-period control circuit 42 is in conduction. Thus, the transistor Q4 is turned on such that a current flows into its base from the capacitor C7 via the phototransistor PT1 and a resistor R12, whereby the transistor Q3 is turned on, such that the first switch element Q1 is turned on.

Similar to the switching power supply units 1, 10, and 20 shown in FIG. 1, FIGS. 3 and 5, when the load is light, the photodiode PD1 slowly emits light and the transistor Q3 is slow in conduction, such that the first switch element Q1 is slowly turned on. This increases the off-period of the first switch element Q1 which causes the switching frequency to decrease. Conversely, when the load is heavy, the photodiode PD1 quickly emits light and the transistor Q3 is quick in conduction, such that the first switch element Q1 is quickly turned on. Therefore, the off-period of the first switch element Q1 decreases which causes the switching frequency to increase.

In addition, differently from the switching power supply unit 20 shown in FIG. 5, the current that flows in the photodiode PD1 is supplied from the power-supply circuit 43. Thus, even while ringing occurs (while a voltage across the ends of the feedback winding N3 is vibrating) when the load is heavy, the transistor Q4 is turned on by a stable current, such that malfunction is prevented.

As described above, in the switching power supply unit 40, by controlling the off-period of the first switch element similarly to the switching power supply units 1, 10, and 20, the switching frequency is controlled to decrease as the load decreases, and is controlled to increase as the load increases. Accordingly, the switching loss at light loads is greatly reduced as compared with the related-art RCC switching power supply unit. This enables a reduction in the power consumption and in the amount of heat that is generated at the light load.

Figure 8:
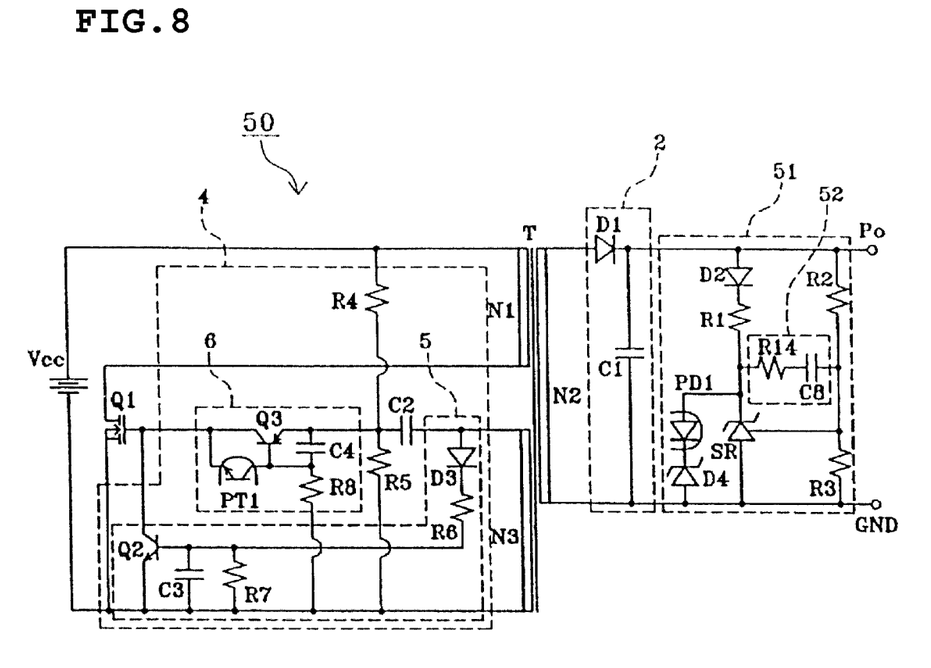
FIG. 8 is a circuit diagram showing still another preferred embodiment of the switching power supply unit of the present invention.

FIG. 8 shows a circuit diagram of another preferred embodiment of the switching power supply unit of the present invention. In FIG. 8, portions that are identical or equivalent to those in FIG. 1 are denoted by identical reference numerals, and the description thereof is omitted.

In FIG. 8, a switching power supply unit 50 includes an output-voltage detecting circuit 51 in place of the output-voltage detecting circuit 3 in the switching power supply unit 1 in FIG. 1. In the output-voltage detecting circuit 51, a negative feedback circuit 52 including a series circuit defined by a resistor R14 and a capacitor C8 is connected between a junction of a resistor R1 and a shunt regulator SR and a junction of a resistor R2 and a resistor R3. A capacitor C4 and a phototransistor PT1 define a time constant circuit. The capacitance of the capacitor C4 in an off-period control circuit 6 is preferably sufficiently large so as to be used as a time constant capacitor.

In the switching power supply unit 50 having the above-described structure, when a voltage at an output terminal Po is increased such that a first switch element Q1 is turned off causing a current to flow from a secondary winding N2 to a rectification circuit 2, the phototransistor PT1 always operates in the active region without a rapid decrease in a current flowing in a photodiode PD1 because the output-voltage detecting circuit 51 includes the negative feedback circuit 52. Thus, the voltage across the ends of the capacitor 4, which forms the time constant circuit, gradually increases, and after a predetermined time passes, the transistor Q3 is turned on, and the first switch element Q1 is turned on.

In other words, the switching power supply unit 1 has a switching frequency determined such that the photodiode PD1 is turned on and off directly dependently on a change in the voltage (an output ripple) at the output terminal Po (the switching frequency must be determined such that the output ripple is a desired value), while the switching power supply unit 50 includes the time constant of the feedback circuit 52 which determines the turning on and off of the switching frequency, and further determines the switching frequency. Accordingly, the output ripple and the switching frequency can be arbitrarily set, respectively.

Figure 9:
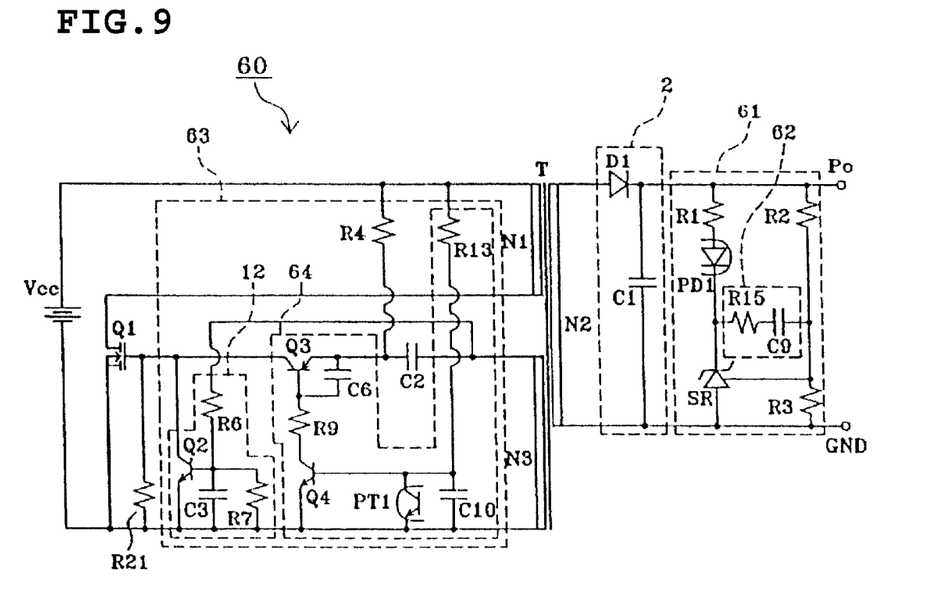
FIG. 9 is a circuit diagram showing still another preferred embodiment of the switching power supply unit of the present invention.

FIG. 9 shows another preferred embodiment of a circuit diagram of the switching power supply unit according to the present invention. In FIG. 9, portions that are identical or equivalent to those in FIG. 6 are denoted by identical reference numerals, and the description thereof is omitted.

In FIG. 9, a switching power supply unit 60 includes an output-voltage detecting circuit 61 in place of the output-voltage detecting circuit 31 of the switching power supply unit 30 in FIG. 6. In the output-voltage detecting circuit 61, a negative feedback circuit 62 defined by a series circuit of a resistor R15 and a capacitor C9 is connected between a junction of a photodiode PD1 and a shunt regulator SR and a junction of a resistor R2 and a resistor R3 in the output-voltage detecting circuit 61. Also, a control circuit 63 is included in place of the control circuit 32 in the switching power supply unit 30. The control circuit 63 includes an off-period control circuit 64 in place of the off-period control circuit 33. The off-period control circuit 64 includes a resistor R13 and a phototransistor PT1, and a capacitor C10 for defining a time constant circuit which is provided in parallel to the phototransistor PT1.

In the switching power supply unit 60 having the above-described structure, when a voltage at an output terminal Po is increased such that a first switch element Q1 is turned off causing a current to flow from a secondary winding N2 to a rectification circuit 2, the phototransistor PT1 always operates in the active region without a rapid decrease in a current flowing in a photodiode PD1 because the output-voltage detecting circuit 61 includes the negative feedback circuit 62. Thus, the voltage across the ends of the capacitor C10, which forms the time constant circuit, gradually increases, and after a desired time passes, the transistor Q4 is turned on, then the transistor Q3 is turned on, and the first switch element Q1 is turned on.

In other words, the switching power supply unit 30 has a switching frequency determined such that the photodiode PD1 is turned on and off directly dependently on a change in the voltage (an output ripple) at the output terminal Po (the switching frequency must be determined so that the output ripple is a desired value), while the switching power supply unit 60 has the time constant of the feedback circuit 62 which determines the turning on and off of the switching frequency and further determines the switching frequency. Accordingly, the output ripple and the switching frequency can be arbitrarily set, respectively.

Since the first switch element Q1 is turned on when the photodiode PD1 does not emit light and the phototransistor PT1 has a high impedance, an starting circuit is easily provided.

Figure 10:
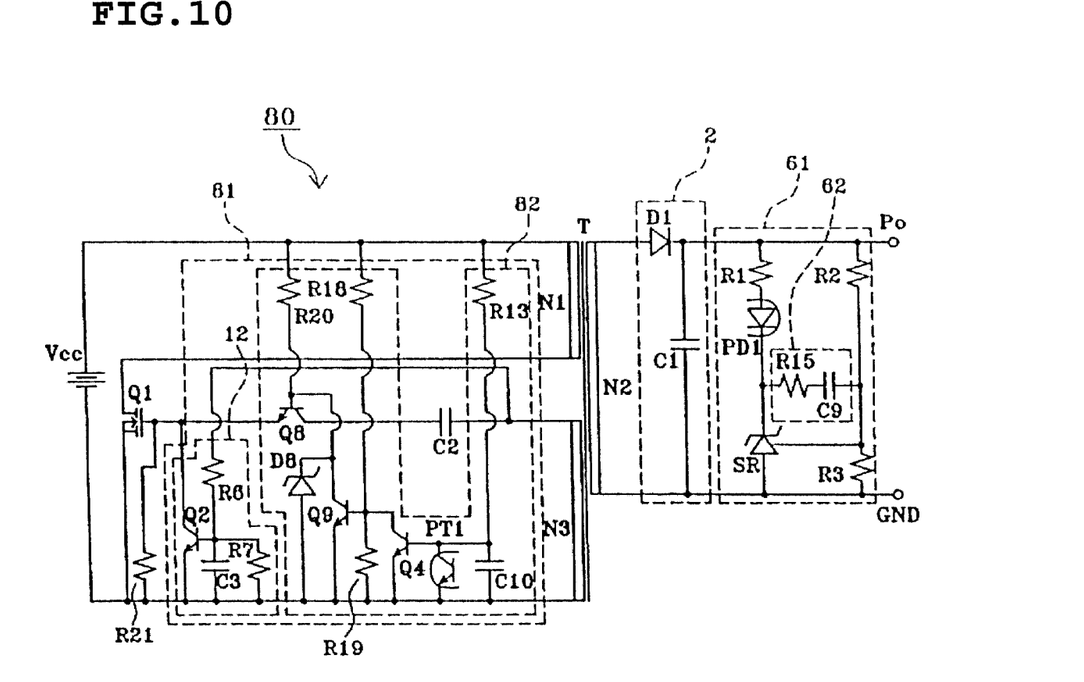
FIG. 10 is a circuit diagram showing still another preferred embodiment of the switching power supply unit of the present invention.

FIG. 10 shows a circuit diagram of another preferred embodiment of the switching power supply unit of the present invention. In FIG. 10, portions that are identical or equivalent to those in FIG. 9 are denoted by identical reference numerals, and the description thereof is omitted.

In FIG. 10, a switching power supply unit 80 includes a control circuit 81 in place of the control circuit 63 of the switching power supply unit 60 in FIG. 9. The control circuit 81 includes an off-period control circuit 82 in place of the off-period control circuit 64. The resistor R4 is deleted.

The off-period control circuit 82 includes an NPN transistor Q8 as a second switch element. The transistor Q8 has a collector connected to a capacitor C2, an emitter connected to the gate of a first switch element Q1, and a base connected to one end of a direct-current power supply Vcc via a resistor R20. A transistor Q4 has a collector connected to the base of a transistor Q9, and the transistor Q9 has a collector connected to the base of a transistor Q8, and an emitter connected to the other end of the direct-current power supply Vcc. The base of the transistor Q9 is connected to the one end of the direct-current power supply Vcc via a resistor R18 and to the other end of the direct-current power supply Vcc via a resistor R19. The base of the transistor Q8 is connected to the other end of the direct-current power supply Vcc via a Zener diode D8.

By using comparison with the switching power supply unit 60 in FIG. 9 which uses a PNP transistor as a second switch element, the operation and effects of the switching power supply unit 80 are described below.

First, in the switching power supply unit 60, a starting condition is represented by the following expression:

$$vcc \times ra/(r4+ra) > Vth(Q1)$$

where vcc represents the voltage of the direct-current power supply, ra represents the parallel resistance of the resistors R9 and R21, r4 represents the resistance of the resistor R4, and Vth(Q1) represents the threshold voltage of the first switch element Q1. Voltage drops in the transistors Q3 and Q4 are ignored.

Here, the value of the resistor R9 influences the switching speed of the transistor Q3. As the value of the resistor R9 increases, the base current of the transistor Q3 decreases, whereby the current supplied to the gate of the first switch element Q1 is reduced and the switching speed of the first switch element Q1 decreases. Since the switching loss increases if the switching speed of the first switch element Q1 decreases, the value of the resistor R9 cannot be increased. When the value of the resistor R9 cannot be increased, the value of the resistor R4 also cannot be increased to meet the starting condition. Because the resistor R4 is a starting resistor, the impossibility of increasing the value means that a loss in the resistor R4 cannot be reduced.

In addition, in the case of the switching power supply unit 80 which uses the NPN transistor Q8 as the second switch element, the starting condition is represented by the following expression:

$$vcc \times r21/(r20+r21) > Vth(Q1)$$

where r21 is the resistance of a resistor R21.

In this case, since R21 is a resistor that prevents the first switch element Q1 from performing the switching operation when the output voltage of the direct-current power supply Vcc drops, its resistance can be increased, and also the resistance of the resistor R4 can be accordingly increased. As a result, the loss in the resistor R4 can be reduced.

As described above, the switching power supply unit 80 uses the NPN transistor Q8 as a second switch element, whereby a reduction in the loss can be achieved.

The switching power supply unit 80 is such that, in the switching power supply unit 60, an NPN transistor is used as a second switch element. Similar operation and effects are exhibited by using NPN transistors as second switch elements in the switching power supply units 1, 10, 20, 40, 50, and 60 shown in FIG. 1, FIGS. 3, 5, and 7 to 9.

In the switching power supply unit 80 in FIG. 10, the Zener diode D8 is connected between the base of the transistor Q8 as the second switch element and the other end of the direct-current power supply. The Zener diode D8 combines with the transistor Q8 to define a limit circuit which controls the gate voltage (control voltage) of the first switch element Q1 not to exceed a desired range. Specifically, the gate voltage of the first switch element Q1 is limited to a maximum of $$Vgs(Q1) = Vz(D8) - Vbe(Q8)$$

where Vgs(Q1) represents the gate-source voltage of the first switch element Q1, Vz(D8) represents the Zener voltage of the Zener diode D8, and Vbe(Q8) represents the base-emitter voltage of the transistor Q8. Accordingly, where an input voltage range is broad like the worldwide input, the control voltage of the first switch element Q1 is prevented from exceeding a desired range.

Figure 11:
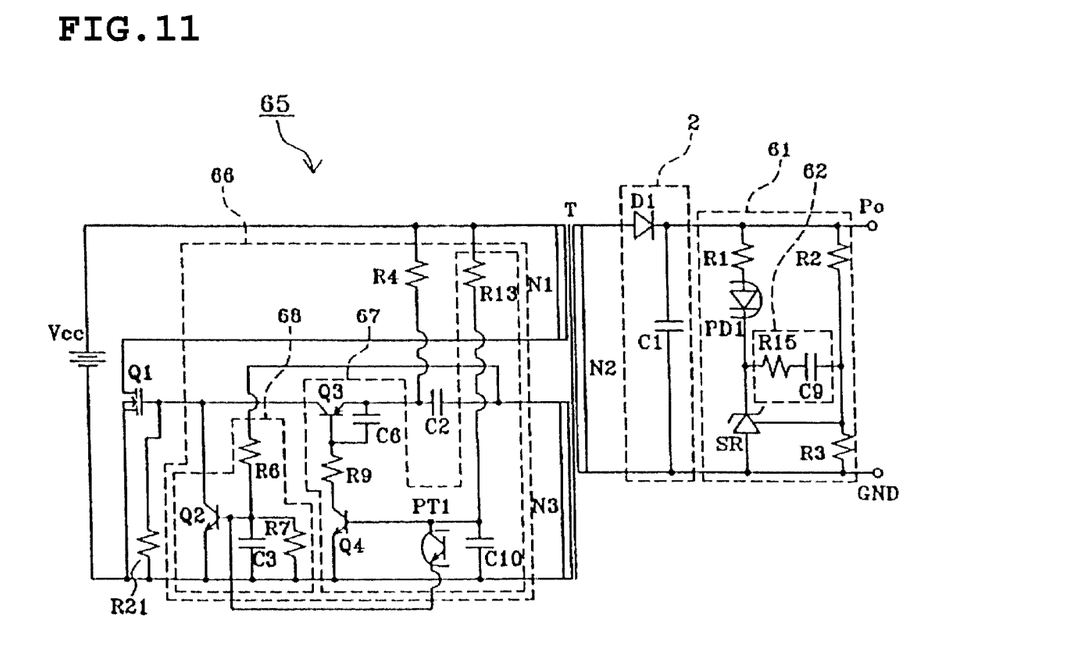
FIG. 11 is a circuit diagram showing still another preferred embodiment of the switching power supply unit of the present invention.

FIG. 11 shows a circuit diagram of another preferred embodiment of the switching power supply unit of the present invention. In FIG. 11, portions that are identical or equivalent to those in FIG. 9 are denoted by identical reference numerals, and the description thereof is omitted.

In FIG. 11, a switching power supply unit 65 includes a control circuit 66 in place of the control circuit 63 in the switching power supply unit 60 in FIG. 9. The control circuit 66 includes an off-period control circuit 67 in place of the off-period control circuit 64, and a turn-off circuit 68 in place of the turn-off circuit 12. The off-period control circuit 67 and the turn-off circuit 68 differ from the off-period control circuit 64 and the turn-off circuit 12 only in that the emitter of the a phototransistor PT1 in the off-period control circuit 67 is connected to the base of a transistor Q2 in the turn-off circuit 68.

The operation of the switching power supply unit 65 having the above-described structure is described below.

When a first switch element Q1 is turned off, and the voltage across the ends of a capacitor 10 defining a time constant circuit gradually increases, a current flowing in a phototransistor PT1 functions as a forward charging current for a capacitor C3 connected to the base of the transistor Q2. In other words, during the off-period of the first switch element Q1, the timing with which the turning off of the turn-off circuit 68 can be accelerated is based on a feedback signal from a output-voltage detecting circuit 61.

As the load is decreased, the output voltage decreases more slowly and the current flowing in the photodiode PD1 increases, such that the phototransistor PT1 has a small resistance and the capacitor C10 has a small charging current while the charging current to the capacitor C3 via the phototransistor PT1 is large. Thus, the capacitor C3 is charged to some extent while the first switch element Q1 is being turned off. When the voltage across the ends of the capacitor C10 increases to a desired value with the progress of charging, the transistor Q4 is turned on, the transistor Q3 is turned on, and the first switch element Q1 is turned on. Although a current that flows from a feedback winding N3 to a resistor R6 charges the capacitor C3 when the first switch element Q1 is turned on, the voltage across the ends of the capacitor C3 immediately reaches a level capable of turning on the transistor Q2 since the capacitor C3 has been charged to some extent, such that the transistor Q2 is turned on and the first switch element Q1 is turned off. In this manner, the current flowing in the phototransistor PT1 charges the capacitor C3 while the first switch element Q1 is off at light loads. Thus, timing with which the turn-off circuit 68 is turned off is accelerated, and the on-period of the first switch element Q1 is decreased. Accordingly, at light loads, the first switch element Q1 has an increased off-period and conversely has a decreased on period.

In addition, at a rated load, the current flowing in the photodiode PD1 is small. Thus, the phototransistor PT1 has a relatively large resistance and the capacitor C10 has an increased charging current, while the charging current to the capacitor C3 via the phototransistor PT1 is reduced. Therefore, the first switch element Q1 has a decreased off-period and conversely an increased on-period.

Because almost no current flows in the photodiode PD1 at heavy loads, the phototransistor PT1 has a relatively large resistance. As a result, the voltage across the ends of the capacitor C10 is maintained to be approximately constant, thus setting the transistors Q4 and Q3 to be always in the ON state. There is almost no current charging the capacitor C3 via the phototransistor PT1. In this condition, the off-period control circuit 67 does not substantially operate. Thus, when the flow of a current generated by the magnetic energy stored in a transformer T from a secondary winding N2 ends, a kick voltage generated in the feedback winding N3 turns the first switch element Q1 on, and a current starts to flow in a primary winding N1. In other words, at heavy loads, an operation in a critical mode of current is activated similarly to the common RCC switching power supply unit.

As described above, when the switching power supply unit 65 has a light load, it controls both the off-period and the on-period. Since it is controlled to operate in the critical mode of current when having a heavy load, it suppresses a current peak in a current flowing period as long as it has no current halt period, as compared with a switching power supply unit that always operating in a current-discontinuous mode, such as the switching power supply unit 60 does not suppress such a current peak. Regarding the loss inside the switching power supply unit with the heavy load, a conduction loss is more prominent than the switching loss. Thus, when the load is heavy, the conduction loss in the switching power supply unit 65 is less than that in the switching power supply unit 60.

Figure 12A:
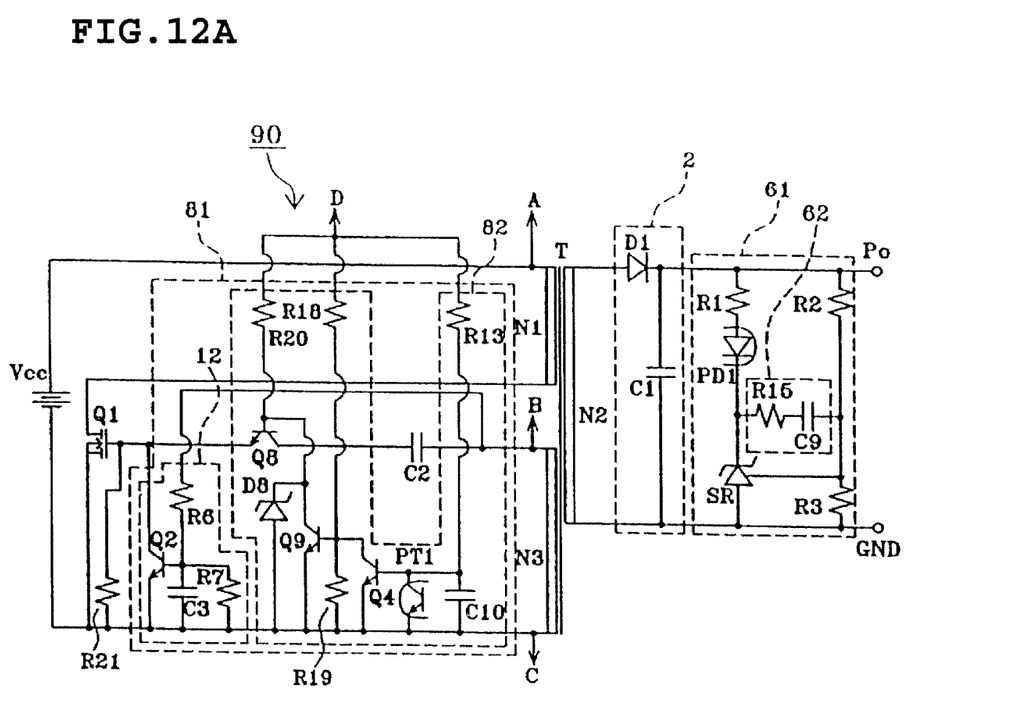
FIGS. 12A and 12B are circuit diagrams showing still preferred another embodiment of the switching power supply unit of the present invention.
Figure 12B:
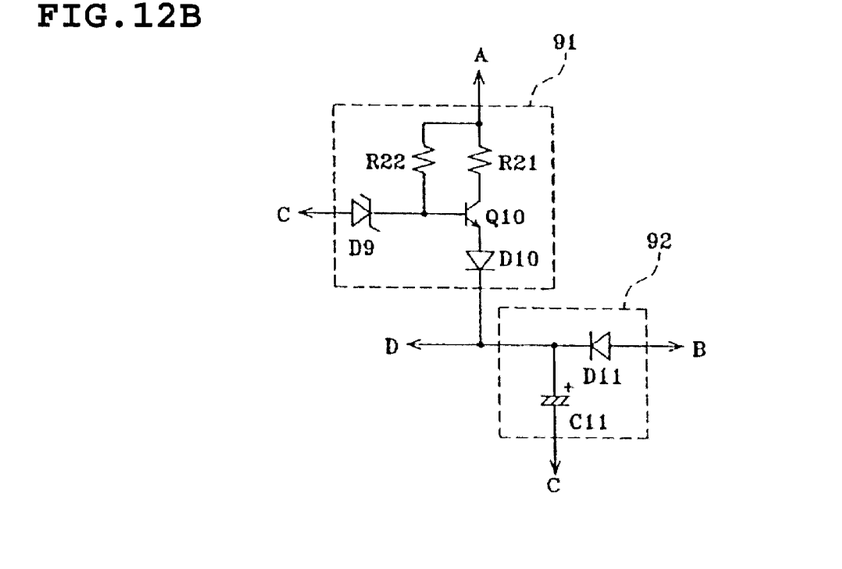

FIGS. 12A and 12B show circuit diagrams of another preferred embodiment of the switching power supply unit of the present invention. In FIGS. 12A and 12B, portions that are identical or equivalent to those in FIG. 10 are denoted by identical reference numerals, and the description thereof is omitted.

In FIG. 12A, a switching power supply unit 90 includes a constant voltage regulator 91 and a direct-current voltage supply 92. In FIGS. 12A and 12B, point A indicates one end (one end of a primary winding N1) of a direct-current power supply Vcc, point B indicates one end of a feedback winding N3, point C indicates the other end (the other end of the feedback winding N3 and the ground) of the direct-current power supply Vcc, and point D indicates a junction of resistors R13, R18, and R20. However, in FIG. 10, point D is connected to point A.

The constant voltage regulator 91 has resistors R21 and R22, a transistor Q10, a Zener diode D9, and a diode D10. The transistor Q10 has a collector connected to point A by the resistor R21, a base connected to point C by the Zener diode D9, and an emitter connected to point D by the diode D10. The base of the transistor Q10 is also connected to point A by the resistor R22. In this arrangement, the base voltage of the transistor Q0 is constant into the Zener voltage of the Zener diode D9. As a result, the emitter of the transistor Q10 is set to have a constant voltage which is approximately 0.6 V less than the voltage of the base.

The direct-current voltage supply 92 is a rectification circuit having a diode D11 and a capacitor C11. The cathode of the diode D11 is obtained by rectifying the voltage generated in the feedback winding N3.

The emitter of the transistor Q10 in the constant voltage regulator 91 is connected to the cathode of the diode 11 in the direct-current voltage supply 92 by the diode D10 and is connected to point D.

When power is supplied to the switching power supply unit 90, the direct-current voltage supply 92 does not function because no voltage is generated in the feedback winding N3, and the constant voltage maintained by the constant voltage regulator 91 is supplied to point D by the diode D10. When the generation of the voltage in the feedback winding N3 causes the direct-current voltage supply 92 to begin to function, the cathode voltage of the diode D11 is higher than the emitter voltage of the transistor Q10. Thus, the output voltage of the direct-current voltage supply 92 is supplied to point D. The current supplied from the constant voltage regulator 91 to point D is cut off. In other words, the diode D10 functions to prevent the current from flowing back from the direct-current voltage supply 92 to the constant voltage regulator 91.

In the switching power supply unit 90 having the above-described structure, at times other than when the power is supplied, a voltage that is less than that of the direct-current power supply Vcc is applied from the direct-current voltage supply 92 to a resistor R18 as a starting resistance. Accordingly, power consumption is reduced as compared with the case of direct voltage supply from the direct-current power supply Vcc.

This type of arrangement using a constant voltage regulator and a direct-current voltage supply is applicable in any of the above preferred embodiments, and operates and produces effects similar to the switching power supply unit 90.

Figure 13:
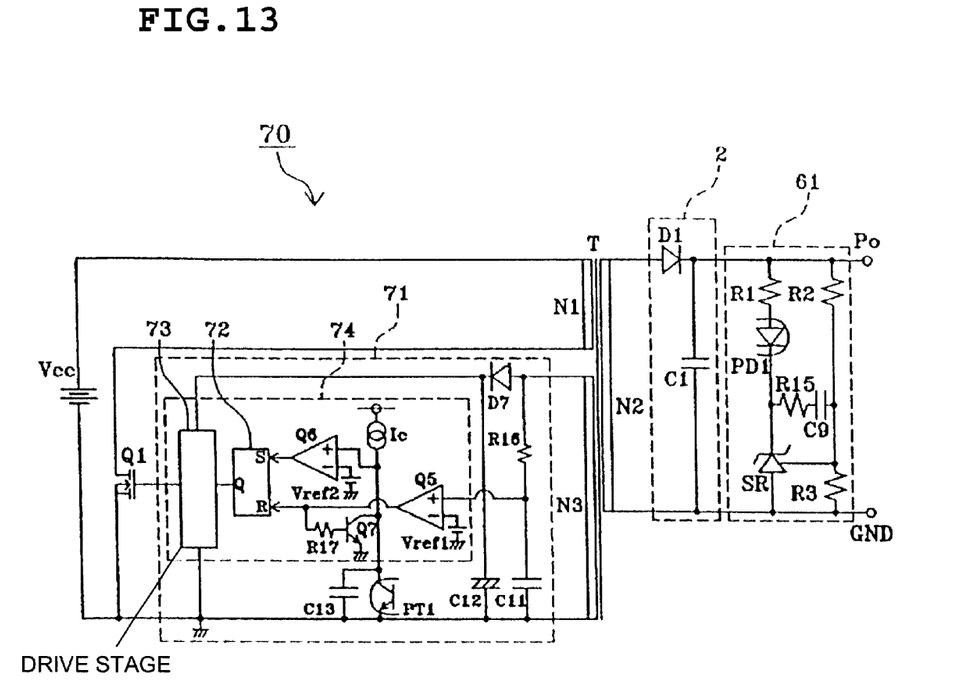
FIG. 13 is a circuit diagram showing still another preferred embodiment of the switching power supply unit of the present invention.

FIG. 13 shows a circuit diagram of another preferred embodiment of the switching power supply unit of the present invention. In FIG. 13, portions which are identical or equivalent to those in FIGS. 6 and 9 are denoted by identical reference numerals, and the description thereof is omitted.

In FIG. 13, a switching power supply unit 70 includes a control circuit 71 in place of the control circuit 32 of the switching power supply unit 30 in FIG. 6, and an output-voltage detecting circuit 61 in place of the output-voltage detecting circuit 31.

The control circuit 71 includes resistors R16 and R17, capacitors C11, C12, and C13, a current supply Ic, an operational amplifiers Q5 and Q6, reference voltage supplies Vref1 and Vref2, a transistor Q7, an RS flip-flop 72, a drive stage 73, and a phototransistor PT1.

A series circuit defined by the resistor R16 and the capacitor C11 is connected across one end and the other end of a feedback winding N3. A rectification circuit defined by a diode D7 and the capacitor C12 is also connected across the one end and the other end of the feedback winding N3, and its output is used as each power supply for each component of the control circuit 71 including the drive stage 73. A junction of the resistor R16 and the capacitor C11, and the reference voltage supply Vref1 are connected to the non-inverted input terminal and inverted input terminal of the operational amplifier Q5, respectively. The current supply Ic and the reference voltage supply Vref2 are connected to the non-inverted input terminal and inverted input terminal of the operational amplifier Q6, respectively. The outputs of the operational amplifiers Q5 and Q6 are connected to the R terminal and S terminal of the RS flip-flop 72, respectively. The Q terminal of the RS flip-flop 72 is connected to the gate of a first switch element Q1 by the drive stage 73. The transistor Q7 has a collector connected to the current supply Ic, an emitter which is grounded, and a base connected to the output terminal of the operational amplifier Q5 by the resistor R17. The phototransistor PT1 has a collector connected to the current supply Ic, an emitter which is grounded, and the capacitor C13 connected across the collector and the emitter.

The resistor R17, the capacitor C13, the current supply Ic, the operational amplifiers Q5 and Q6, the reference voltage supplies Vref1 and Vref2, the transistor Q7, the RS flip-flop 72, and the drive stage 73 are integrated to define an IC 74.

Figure 14:
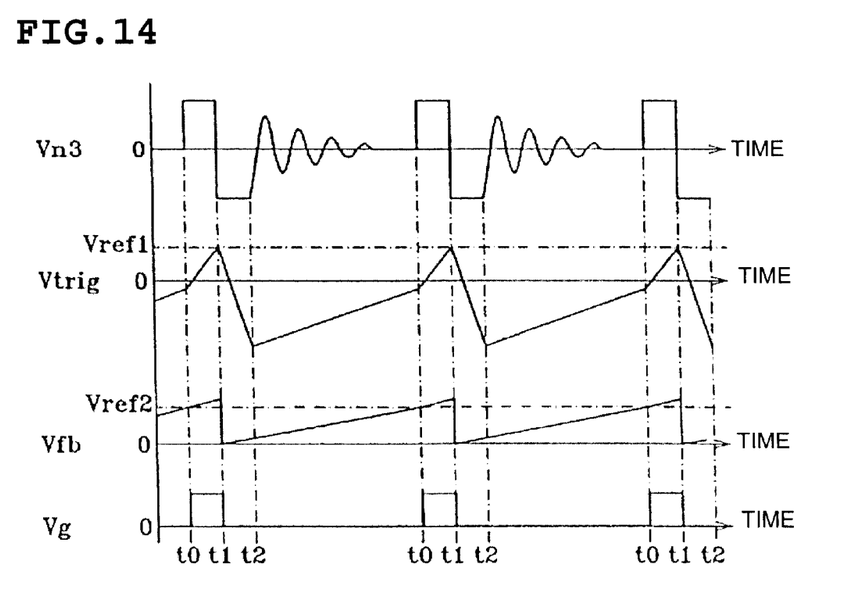
FIG. 14 is a waveform chart showing temporal changes in voltages in portions of the switching power supply unit in FIG. 13.

FIG. 14 shows temporal changes in a voltage generated in the feedback winding N3, a voltage Vtrig input to the non-inverted input terminal of the operational amplifier Q5, a voltage Vfb input to the non-inverted input terminal of the operational amplifier Q6, and the gate voltage Vg of the first switch element Q1 in the switching power supply unit 70. The operation of the switching power supply unit 70 is described with reference thereto.

In the switching power supply unit 70, when Vfb reaches Vref2, the RS flip-flop 72 is set, Vg is in the H level, and the first switch element Q1 is turned on (t0).

When the first switch element Q1 is turned on, a forward voltage is generated in the feedback winding N3, whereby the capacitor C11 charges, thus increasing Vtrig. When Vtrig reaches Vref1, the RS flip-flop 72 is reset, Vg is in the L level, and the first switch element Q1 is turned off (t1). At this time, the time required for Vtrig to reach Vref is greater as Vtrig at time to is lower. Also, Vfb is set to 0 V such that the transistor Q7 is turned on.

When the first switch element Q1 is turned off, a current begins to flow to the secondary side. This increases a voltage Po at an output terminal Po and a photodiode PD1 emits light. Simultaneously, a reverse voltage is generated in the feedback winding N3, thus causing the capacitor C11 to discharge, and Vtrig becomes a negative voltage for reverse charging.

When the current flowing on the secondary side stops flowing (t2), the voltage of the feedback winding N3 starts ringing. Simultaneously, Vfb starts to rise again. When it reaches Vref2, the time returns to t0, and this is repeatedly performed. The inclination of the rise in Vfb is determined by the phototransistor PT1. When the load is light, the light emission of the photodiode PD1 increases, such that the rise of Vfb slows, the off-period of the first switch element Q1 increases, and the switching frequency decreases.

Since Vtrig works similarly to the base voltage of the transistor Q2 in the switching power supply unit 30 in FIG. 6, Vtrig increases and is close to 0 V when the off-period of the first switch element Q1 is increased. Thus, the off-period of the first switch element Q1 decreases.

Figure 15:
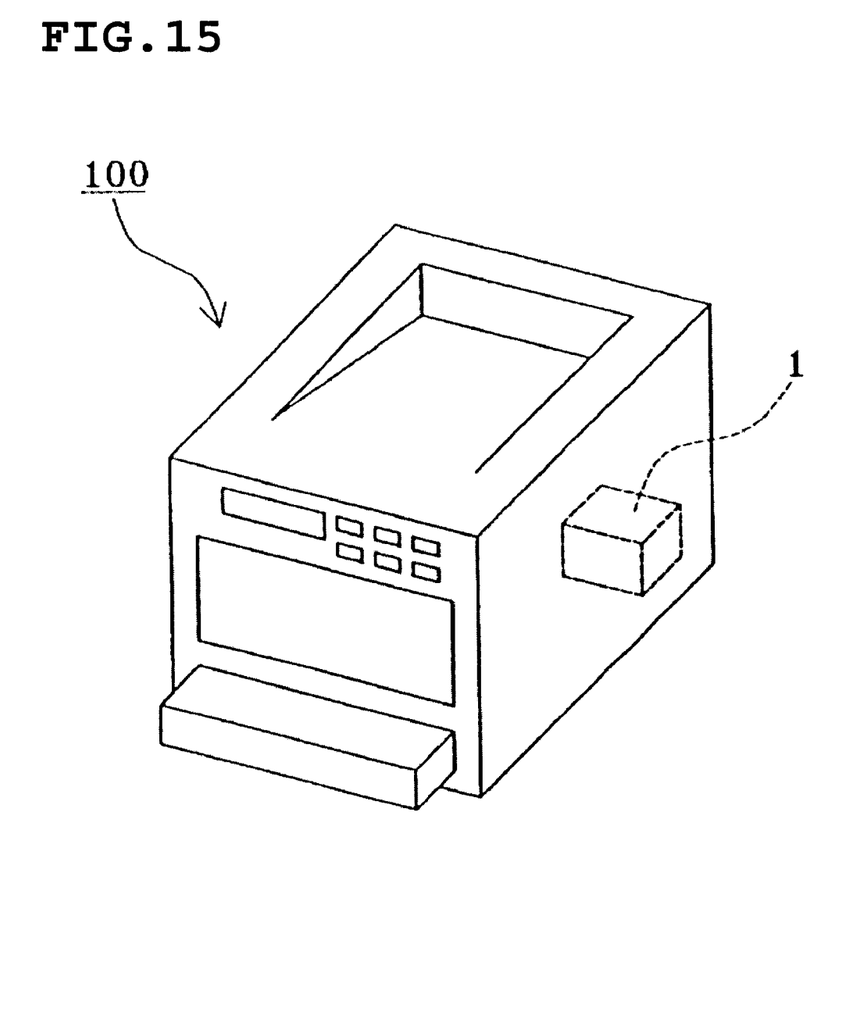
FIG. 15 is a perspective view showing a preferred embodiment of an electronic apparatus of the present invention.

FIG. 15 shows a perspective view of a preferred embodiment of an electronic apparatus of the present invention. In FIG. 15, a printer 100 as an electronic apparatus preferably includes the switching power supply unit 1 of the present invention as a portion of a power supply circuit.

Although a portion related to the printing operation of the printer 100 consumes power when performing printing, it consumes almost no power in a standby mode in which it does not perform a printing operation. Since the power supply unit 1 according to a preferred embodiment of the present invention is used, power loss in the standby mode is greatly reduced and greatly improved efficiency is achieved. Although the switching power supply unit 1 shown in FIG. 1 is included in the printer 100 shown in FIG. 15, the switching power supply units 10, 20, 30, 40, 50, 60, 65, 70, 80, and 90 which are shown in FIGS. 3, and 5 to 13 may be included, and similar operations and effects are obtained.

The electronic apparatus is not limited to a printer but may include every type of electronic apparatus requiring a stable-voltage direct-current power supply, such as a notebook computer or a portable information device.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A switching power supply unit comprising:
   a transformer including a primary winding, a secondary winding, and a feedback winding;
   a first switch element connected in series to said primary winding;
   a control circuit provided between said feedback winding and a control terminal of said first switch element;
   a rectification circuit connected to said secondary winding; and
   an output-voltage detecting circuit which detects an output voltage output from said rectification circuit and feeds back voltage to said control circuit;
   wherein said control circuit includes a turn-off circuit for turning off said first switch element when it has been in an ON state, and an off-period control circuit which controls the off-period of said first switch element to be greater as a load is lighter, based on a feedback signal from said output-voltage detecting circuit, by delaying the turning-on of said first switch element.

2. A switching power supply unit according to claim 1, wherein said off-period control circuit includes a second switch element which is provided between said feedback winding and the control terminal of said first switch element and which is controlled to be turned on and off based on the feedback signal from said output-voltage detecting circuit.

3. A switching power supply unit according to claim 2, wherein said second switch element is one of an NPN transistor and an n-channel FET.

4. A switching power supply unit according to claim 2, further comprising a limit circuit for preventing a control voltage for said first switch element from exceeding a desired range, said limit circuit including said second switch element.

5. A switching power supply unit according to claim 1, wherein:
   said off-period control circuit includes a second switch element provided between said feedback winding and the control terminal of said first switch element, and a time constant circuit which is connected to the control terminal of said second switch element and in which a time constant is controlled based on the feedback signal of said output-voltage detecting circuit; and
   said output-voltage detecting circuit includes a negative feedback circuit for maintaining the feedback signal to be substantially constant.

6. A switching power supply unit according to claim 1, wherein said turn-off circuit includes an on-period extension circuit which increases the on-period of said first switch element as a period in which the turning-on of said first switch element is delayed by said off-period control circuit decreases.

7. A switching power supply unit according to claim 6, wherein:
   said turn-off circuit includes a third switch element which turns on said first switch element by connecting to the control terminal of said first switch element so as be turned on; and
   said on-period extension circuit includes a capacitor which is connected to the control terminal of said third switch element and which is controlled to discharge in accordance with the length of the off-period of said first switch element after charging in a reverse direction in the off-period of said first switch element, and is controlled to charge in a forward direction to a voltage turning on said third switch element during the on-period of said first switch element.

8. A switching power supply unit according to claim 1, wherein said off-period control circuit and said turn-off circuit included in said control circuit accelerates, based on the feedback signal from said output-voltage detecting circuit, timing with which said turn-off circuit performs turning off during the off-period of said first switch element.

9. A switching power supply unit according to claim 8, wherein said off-period control circuit includes a phototransistor which receives the feedback signal from said output-voltage detecting circuit and allows an increased current to flow as the load reduces, and the emitter of said phototransistor is connected to said on-period extension circuit such that a current flowing in said phototransistor charges the capacitor of said on-period extension circuit.

10. A switching power supply unit according to claim 1, wherein said control circuit includes a voltage supply circuit for supplying a control voltage to said off-period control circuit by using a voltage generated in said feedback winding.

11. A switching power supply unit according to claim 1, further including a direct-current voltage supply for supplying a driving voltage to said off-period control circuit by using the voltage generated in said feedback winding, and a constant voltage regulator which is provided between an input power supply and the output of said direct-current voltage supply and which is arranged to prevent a current from reversely flowing.

12. A switching power supply unit according to claim 1, wherein said rectification circuit includes a diode connected in series to the second winding and a smoothing capacitor connected between a cathode of said diode and a ground.

13. A switching power supply unit according to claim 1, wherein said output-voltage detecting circuit includes a series circuit defined by a diode, a resistor and a shunt regulator.

14. A switching power supply unit according to claim 1, wherein said turn-off circuit includes a NPN transistor, and said off-period control circuit includes a PNP transistor.

15. A switching power supply unit according to claim 1, wherein said output-voltage detecting circuit includes a series circuit defined by a resistor, a photodiode and a shunt regulator.

16. A switching power supply unit according to claim 10, wherein said voltage supply circuit includes a diode and a capacitor that are connected across ends of the feedback winding.

17. A switching power supply unit according to claim 1, wherein the output-voltage detecting circuit includes a negative feedback circuit including a series circuit defined by a resistor and a capacitor.

18. A switching power supply unit according to claim 1, wherein the off-period control circuit includes an NPN transistor defining a second switch element.

19. An electronic apparatus comprising:
a switching power supply unit including:
a transformer including a primary winding, a secondary winding, and a feedback winding;
a first switch element connected in series to said primary winding;
a control circuit provided between said feedback winding and a control terminal of said first switch element;
a rectification circuit connected to said secondary winding; and
an output-voltage detecting circuit which detects an output voltage output from said rectification circuit and feeds back voltage to said control circuit;
wherein said control circuit includes a turn-off circuit for turning off said first switch element when it has been in an ON state, and an off-period control circuit which controls the off-period of said first switch element to be greater as a load is lighter, based on a feedback signal from said output-voltage detecting circuit, by delaying the turning-on of said first switch element.

20. A printer apparatus comprising:
a switching power supply unit including:
a transformer including a primary winding, a secondary winding, and a feedback winding;
a first switch element connected in series to said primary winding;
a control circuit provided between said feedback winding and a control terminal of said first switch element;
a rectification circuit connected to said secondary winding; and
an output-voltage detecting circuit which detects an output voltage output from said rectification circuit and feeds back voltage to said control circuit;
wherein said control circuit includes a turn-off circuit for turning off said first switch element when it has been in an ON state, and an off-period control circuit which controls the off-period of said first switch element to be greater as a load is lighter, based on a feedback signal from said output-voltage detecting circuit, by delaying the turning-on of said first switch element.

* * * * *